(12) United States Patent
Hagihara et al.

(10) Patent No.: US 9,903,744 B2
(45) Date of Patent: Feb. 27, 2018

(54) METHOD OF PRODUCING ULTRASONIC FLOWMETER, ULTRASONIC FLOWMETER PRODUCED BY THE METHOD AND FLUID CONTROLLER HAVING THE ULTRASONIC FLOWMETER

(71) Applicant: ASAHI ORGANIC CHEMICALS INDUSTRY CO., LTD., Miyazaki (JP)

(72) Inventors: Syunichirou Hagihara, Miyazaki (JP); Hidenori Ebihara, Miyazaki (JP)

(73) Assignee: ASAHI ORGANIC CHEMICALS INDUSTRY CO., LTD., Miyazaki (JP)

( * ) Notice: Subject to any disclaimer, the term of this patent is extended or adjusted under 35 U.S.C. 154(b) by 466 days.

(21) Appl. No.: 14/061,254

(22) Filed: Oct. 23, 2013

(65) Prior Publication Data

US 2014/0174561 A1 Jun. 26, 2014

(30) Foreign Application Priority Data

Oct. 24, 2012 (JP) ................................. 2012-234890

(51) Int. Cl.
*B29C 45/14* (2006.01)
*G01F 1/66* (2006.01)
*G01F 15/18* (2006.01)

(52) U.S. Cl.
CPC .......... *G01F 1/66* (2013.01); *B29C 45/14409* (2013.01); *G01F 1/662* (2013.01);
(Continued)

(58) Field of Classification Search
CPC ........ G01F 1/662; G01F 1/7082; G01F 15/18; B29C 2045/14147; B29C 45/14836; B29C 45/14409; B29C 2045/14139
See application file for complete search history.

(56) References Cited

U.S. PATENT DOCUMENTS 5,942,169 A * 8/1999 Narazaki ........... B29C 45/14622
264/266
8,136,554 B2 * 3/2012 Junger ............... B29C 45/14221
138/109
(Continued)

FOREIGN PATENT DOCUMENTS

EP 2696458 A1 * 2/2014 ........... H02G 3/0462
JP 11-210941 A 8/1999
(Continued)

OTHER PUBLICATIONS

Office Action in JP Application No. 2012-234890, dated Jun. 7, 2016.

*Primary Examiner* — William P Bell
(74) *Attorney, Agent, or Firm* — Hauptman Ham, LLP (57) ABSTRACT

An ultrasonic flowmeter includes a measurement pipe through which a fluid flows, and two ultrasonic transceivers provided on outer side portions of the measurement pipe so as to be spaced apart from each other in an axis direction. In the method of producing the ultrasonic flowmeter, fabricating the measurement pipe in advance is fabricated, and then is set in a mold as an insert. Two transmitting bodies are formed by insert molding on the outer side portions of the measurement pipe so as to be spaced apart from each other in the axis direction, so that the two transmitting bodies are integral with the measurement pipe. The two ultrasonic transceivers are mounted on the two transmitting bodies, respectively.

7 Claims, 8 Drawing Sheets

(52) U.S. Cl.
CPC .... *B29C 2045/14147* (2013.01); *G01F 15/18* (2013.01); *Y10T 29/49005* (2015.01); *Y10T 137/7722* (2015.04)

(56) References Cited

U.S. PATENT DOCUMENTS

| | | | | |
|---|---|---|---|---|
| 2002/0108450 | A1* | 8/2002 | Ohnishi | G01F 1/662 73/861.27 |
| 2003/0013791 | A1* | 1/2003 | Blong | C08F 214/262 524/379 |
| 2003/0211265 | A1* | 11/2003 | Balbaugh | B29C 45/14598 428/36.9 |
| 2007/0151361 | A1 | 7/2007 | Kamimura | |
| 2007/0151362 | A1* | 7/2007 | Mori | G01F 1/663 73/861.27 |
| 2008/0161481 | A1* | 7/2008 | Abusleme | C08L 27/12 524/544 |
| 2009/0249889 | A1 | 10/2009 | Kamimura | |
| 2009/0266428 | A1 | 10/2009 | Yoshino et al. | |
| 2011/0023621 | A1* | 2/2011 | Augenstein | G01F 1/662 73/861.18 |
| 2012/0036942 | A1 | 2/2012 | Hasunuma | |

FOREIGN PATENT DOCUMENTS

| | | |
|---|---|---|
| JP | 2000146645 A | 5/2000 |
| JP | 2002-306892 A | 10/2002 |
| JP | 2004-157101 | 6/2004 |
| JP | 2005188974 A | 7/2005 |
| JP | 2006337059 A | 12/2006 |
| JP | 2007058352 A | 3/2007 |
| JP | 2008275607 A | 11/2008 |
| JP | 2011112499 A | 6/2011 |
| JP | 2012042243 A | 3/2012 |
| WO | 2005/064288 A1 | 7/2005 |
| WO | WO 2012137679 A1 * 10/2012 ........... H02G 3/0462 |  |

* cited by examiner

METHOD OF PRODUCING ULTRASONIC FLOWMETER, ULTRASONIC FLOWMETER PRODUCED BY THE METHOD AND FLUID CONTROLLER HAVING THE ULTRASONIC FLOWMETER

CROSS-REFERENCE TO RELATED APPLICATIONS

This application is based on Japanese Patent Application No. 2012-23489089.

BACKGROUND OF THE INVENTION

1. Field of the Invention

The present invention relates to a method of producing an ultrasonic flowmeter, an ultrasonic flowmeter produced by the method, and a fluid controller having the ultrasonic flowmeter, which ultrasonic flowmeter is used in fluid transportation in various industries such as chemical works, semiconductor manufacture field, food processing field and biotechnology field, which propagates an ultrasonic vibration through a fluid and measures a flow velocity or flow rate of the fluid from a difference between ultrasonic wave propagation time from an upstream side of the flow and ultrasonic wave propagation time from a downstream side of the flow. The present invention particularly relates to a method of producing an ultrasonic flowmeter, an ultrasonic flowmeter produced by the method, and a fluid controller having the ultrasonic flowmeter, which ultrasonic flowmeter is suitable for measuring a micro flow rate and the flow rate of a slurry fluid or especially the CMP slurry fluid used in the semiconductor field.

2. Description of the Related Art

Ultrasonic flowmeters for measuring a flow velocity or flow rate of a fluid flowing in a measurement pipe from a difference in ultrasonic wave propagation time are generally classified into two types.

In a first type of ultrasonic flowmeter, flow passages are connected to both ends of a linear measurement pipe so that the flow passages are at generally right angle to the measurement pipe, and ultrasonic transceivers are disposed on an upstream side and a downstream side of the measurement pipe so that the ultrasonic transceivers face each other across the measurement pipe. In the ultrasonic flowmeter, an ultrasonic wave transmitted from the upstream ultrasonic transceiver is propagated through a fluid in the measurement pipe and received by the downstream ultrasonic transceiver. Instantaneously after that, an ultrasonic wave transmitted from the downstream transceiver is propagated into the fluid in the measurement and received by the upstream ultrasonic transceiver (see Japanese Unexamined Patent Publication Nos. 2000-146645, 2006-337059, 2007-58352, etc.). In the process, a difference between the ultrasonic wave propagation time from the upstream ultrasonic transceiver to the downstream ultrasonic transceiver and the ultrasonic wave propagation time from the downstream ultrasonic transceiver to the upstream ultrasonic transceiver is used to measure the flow velocity of the fluid in the measurement pipe and measure the flow rate.

In a second type of ultrasonic flowmeter, two ultrasonic transceivers are disposed on transmitting bodies mounted on outer peripheral portions of a linear measurement pipe, respectively. In the ultrasonic flowmeter, an ultrasonic wave transmitted from one of the ultrasonic transceivers is propagated into a fluid in the measurement pipe through the transmitting body and a wall of the measurement pipe, propagated obliquely with respect to a flowing direction of the fluid in the measurement pipe while being reflected on the pipe wall of the measurement pipe, and received by the other ultrasonic transceiver. Instantaneously after that, the transmitting side and the receiving side are switched, and, similarly to above, an ultrasonic wave transmitted from one of the ultrasonic transceivers is received by the other ultrasonic transceiver (see Japanese Unexamined Patent Publication Nos. 2005-188974, 2008-275607, 2011-112499, etc.). In the process, like the first type of the ultrasonic flowmeter, a difference between the ultrasonic wave propagation time from the upstream ultrasonic transceiver to the downstream ultrasonic transceiver and the ultrasonic wave propagation time from the downstream ultrasonic transceiver to the upstream ultrasonic transceiver is used to determine the flow velocity of the fluid in the measurement pipe and measure the flow rate In the first type of the ultrasonic flowmeter, bent portions are formed on both end portions of the measurement pipe. Therefore, especially in a case where a fluid flowing in the measurement pipe is a slurry, the slurry is deposited and fixed to the bent portions, and propagation of the ultrasonic vibration is hindered, thus causing a problem that accurate measurement of the flow rate is not possible. On the contrary, the second type of the ultrasonic flowmeter has an advantage that the above-mentioned problem is unlikely to happen since it is not necessary to form bent portions on both end portions of the measurement pipe.

However, in the second type of the ultrasonic flowmeter, it is necessary to provide the transmitting bodies on the outer peripheral portion of the measurement pipe. In a case where the transmitting bodies fabricated in a process different from the measurement pipe fabricating process are later mounted to the measurement pipe by an adhesive, welding, etc., it is likely that positions of the transmitting bodies with respect to the measurement pipe and a distance between the transmission bodies vary depending on proficiency of an operator, thus causing deterioration of measurement accuracy. Further, factors such as an amount of adhesive applied, drying time of the adhesive, uniformity of application of the adhesive, etc., cause variation in performance of the ultrasonic flowmeter, and therefore need to be controlled in order to ensure performance of the ultrasonic flowmeter. In addition, in a case where a small-diameter measurement pipe is used, a problem occurs that it is difficult to assemble the measurement pipe and the transmitting bodies. It is not necessary to use an adhesive when the measurement pipe and the transmitting bodies are formed integrally with each other by injection molding. However, it is necessary to provide a draft in an inner diameter of the measurement pipe, which makes a flow velocity of a fluid in the measurement pipe non-constant. Therefore, forming the measurement pipe and the transmitting bodies integrally with each other is not suitable especially for fabricating a small-diameter measurement pipe. As a result, when fabricating the transmitting bodies and the measurement pipe integrally with each other, cutting work is often used.

However, with the cutting work, it is especially difficult to fabricate a measurement pipe having a small pipe diameter, and it is also difficult to control quality of an inner peripheral surface of the measurement pipe. Further, microasperity is formed on the inner peripheral surface of the measurement pipe, and microscopic bubbles are thus easily adhered to the inner peripheral surface of the measurement pipe. Surfaces of the microscopic bubbles reflect an ultrasonic vibration, thereby causing a decrease in output signal strength and deterioration of measurement accuracy especially in the second type of the ultrasonic flowmeter in which the ultrasonic vibration is propagated while being reflected within the measurement pipe.

Figure 10:
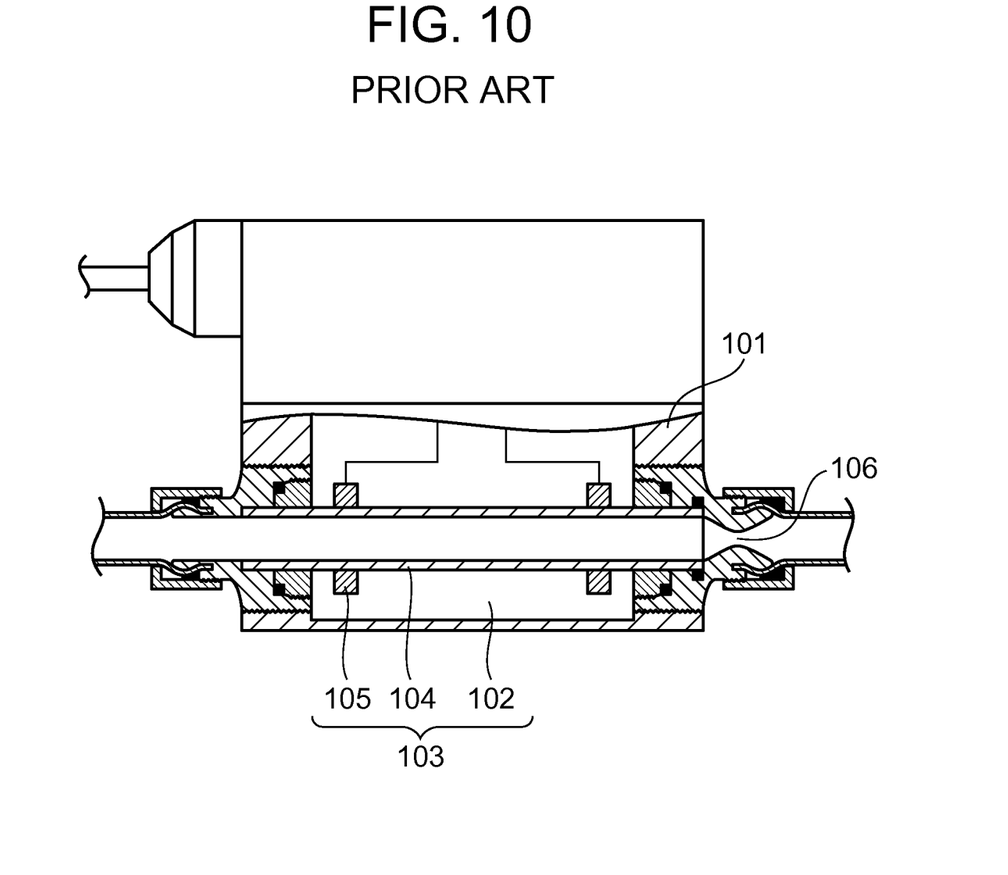
FIG. 10 is a partial cross-sectional side view showing an example of a conventional ultrasonic flowmeter.

In order to solve the problem of the microscopic bubbles inside the measurement pipe, Japanese Unexamined Patent Publication No. 2012-42243 suggests a straight-pipe type ultrasonic flowmeter in which, as shown in FIG. 10, a measurement portion 103 provided in a measurement space 102 of a housing 101 includes a straight pipe member 104 for measurement through which a fluid for measurement flows, and a pair of transducers 105 disposed on an outer periphery of the pipe member 104 at a given interval in an axis direction. A diameter-reduced portion or a bubble-crushing portion 106 is provided on a downstream side of the pipe member 104, thereby crushing small bubbles, which are generated when a flow rate is small and are likely to gather near an inner wall surface. However, pressure drop is caused by the diameter-reduced portion provided as the bubble-crushing portion 106, and foreign matters are likely to be adhered to and deposited on the diameter-reduced portion. Further, it becomes difficult for regular-sized bubbles to pass through due to the diameter-reduced portion, which can cause deterioration of measurement accuracy.

Accordingly, it is an object of the present invention to solve the problems of the prior art and to provide an ultrasonic flowmeter with high measurement accuracy, in which transmitting bodies for ultrasonic transceivers to be mounted thereon are formed integrally with a measurement pipe.

In a first aspect, according to the present invention, there is provided a method of producing an ultrasonic flowmeter including a measurement pipe through which a fluid flows, and two ultrasonic transceivers provided on outer side portions of the measurement pipe so as to be spaced apart from each other in an axis direction, which includes steps of: fabricating the measurement pipe in advance; setting the measurement pipe in a mold as an insert; forming two transmitting bodies by insert molding on the outer side portions of the measurement pipe so as to be spaced apart from each other in the axis direction, so that the two transmitting bodies are integral with the measurement pipe; and mounting the two ultrasonic transceivers on the two transmitting bodies, respectively.

In the method of producing the ultrasonic flowmeter, the measurement pipe fabricated in advance is arranged as the insert in the mold, and the transmitting bodies are formed by insert molding on the outer side portions of the measurement pipe so that the transmitting bodies are integral with the measurement pipe. Therefore, it is possible that the measurement pipe and the transmitting bodies are fabricated in different processes, and it is easy to improve smoothness of an inner peripheral surface of the measurement pipe. Thus, the above method can be easily applied to a measurement pipe having a small diameter. Further, in the above ultrasonic flowmeter production method, it is not necessary to integrate the measurement pipe with the transmitting bodies by using an adhesive. Therefore, a problem that performance of the ultrasonic flowmeter can be varied due to use of an adhesive is avoidable, and fabrication of the measurement pipe having a small diameter can be easier. It is also possible to form the transmitting bodies accurately at predetermined positions on the outer side portions of the measurement pipe with almost no variation. As a result, it can be easier to ensure a certain level of measurement accuracy without depending on proficiency of an operator.

In the ultrasonic flowmeter production method, the measurement pipe is preferably fabricated by extrusion molding.

Since the inner peripheral surface of the measurement pipe fabricated by extrusion molding has a small surface roughness, it is possible to prevent microscopic bubbles from being adhered to the inner peripheral surface of the measurement pipe. Also, when extrusion molding is used, unlike injection molding, no draft is needed in the inner peripheral surface of the measurement pipe, thus preventing influence of the draft on measurement. Therefore, the above method makes it easier to fabricate a measurement pipe having a small diameter and can be applied to fabrication of a measurement pipe having a wide range of diameters. Further, when the measurement pipe is fabricated, heat is applied once. Therefore, when insert molding is carried out by using the measurement pipe, excellent thermal stability and productivity are obtained because the measurement pipe is heated once when the measurement pipe is fabricated. The arithmetic mean roughness Ra of the inner peripheral surface of the measurement pipe more preferably satisfies a relation of $0\ \mu m < Ra \leq 0.2\ \mu m$. When the arithmetic mean roughness of the inner peripheral surface of the measurement pipe is within the above range, adhesion of microscopic bubbles to the inner peripheral surface of the measurement pipe can be prevented effectively.

Preferably, an inner diameter D of the measurement pipe satisfies a relation of $0.5\ mm \leq D \leq 10\ mm$.

Also, the measurement pipe and the transmitting bodies are preferably made of a same material, and the measurement pipe and the transmitting bodies are more preferably made of a fluorine resin.

In the above-mentioned ultrasonic flowmeter production method, a flow passage or a joint may be formed by insert molding on at least one of an upstream side and a downstream side of the measurement pipe so as to be integral with the measurement pipe.

In a second aspect, according to the present invention, there is provided an ultrasonic flowmeter produced by the above-mentioned ultrasonic flowmeter production method.

In a third aspect, according to the present invention, there is provided a fluid controller including the ultrasonic flowmeter described above, and a control part controlling an instrument in accordance with an output from the ultrasonic flowmeter.

In the ultrasonic flowmeter production method according to the present invention, the measurement pipe and the transmitting bodies are formed by insert molding so as to be integral with each other. Therefore, the transmitting bodies can be formed, integrally with the measurement pipe, at accurate positions of the outer side portions of the measurement pipe without needing proficiency of an operator and use of an adhesive, thereby improving measurement accuracy of the ultrasonic flowmeter. Further, smoothness of the inner peripheral surface of the measurement pipe can be improved, thereby making it easier to restrain adhesion of microscopic bubbles to the inner peripheral surface of the measurement pipe. As a result, the ultrasonic flowmeter with high measurement accuracy, which is unlikely to be affected by the microscopic bubbles, can be achieved.

BRIEF DESCRIPTION OF THE SEVERAL VIEWS OF THE DRAWING

The above and other objects, features and advantages of the present invention will be described below in more detail based on embodiments thereof with reference to the accompanying drawings, in which.

DETAILED DESCRIPTION OF THE INVENTION

While embodiments of an method of producing an ultrasonic flowmeter according to the present invention, an ultrasonic flowmeter produced by the method, and a fluid controller having such an ultrasonic flowmeter will be described with reference to the drawings, the present invention should not, of course, be limited thereto.

First, an overall configuration of an ultrasonic flowmeter 10 produced by a method of producing an ultrasonic flowmeter according to the present invention will be described with reference to FIG. 1.

The ultrasonic flowmeter 10 includes a measurement pipe 1 through which a fluid to be measured flows in a filled state, a pair of transmitting bodies 2 constituted by a first transmitting body 2a and a second transmitting body 2b, and ultrasonic transducers 3 serving as ultrasonic transmitter-receivers that are attached on the pair of transmitting bodies 2, respectively.

A surface roughness of an inner peripheral surface 1a of the measurement pipe 1 is smaller than that of an inner peripheral surface of a measurement pipe fabricated by cutting work, so that microscopic bubbles are less likely to be adhered to the inner peripheral surface 1a of the measurement pipe 1. More specifically, an arithmetic mean roughness Ra of the inner peripheral surface 1a of the measurement pipe 1 is smaller than that of an inner peripheral surface of a measurement pipe fabricated by cutting work (normally, about 0.4 μm), in other words, the arithmetic mean roughness Ra of the inner peripheral surface 1a of the measurement pipe 1 is within a range of 0 μm<Ra<0.4 μm, preferably 0 μm≤Ra≤0.2 μm, and more preferably 0 μm<Ra≤0.02 μm. It is preferred that the measurement pipe 1 is fabricated by extrusion molding in order to reduce the surface roughness of the inner peripheral 1a and smooth the inner peripheral surface 1a. A material used for forming the measurement pipe 1 is preferably a synthetic resin such as perfluoroalkoxy fluorocarbon resin (PFA), polyvinylidene fluoride (PVDF), polyvinyl chloride (PVC) or polypropylene (PP), etc., because a synthetic resin is suitable for extrusion molding. However, a material for the measurement pipe 1 is not particularly limited as long as the measurement pipe 1 can propagate an ultrasonic wave, and the measurement pipe 1 may be made of metal such as duralumin, aluminum, aluminum alloy, titanium or stainless steel (SUS). Although an outer diameter and an inner diameter of the measurement pipe 1 are not particularly limited, it is preferred that a pipe wall thickness of the measurement pipe 1 is small in order to facilitate propagation of an ultrasonic vibration. Further, it is preferred that the inner diameter D of the measurement pipe 1 satisfies a relation of 0.5 mm≤D≤10 mm. The reason is why the measurement pipe 1 having the inner diameter of 0.5 mm or more can be used as an insert and a pipe usable for such a measurement pipe 1 can be produced without a special production method, so it is versatile and easily available. Also, in a measurement pipe having an inner diameter of 10 mm or less, an influence of adhesion of the microscopic bubbles is especially great. Therefore, when an ultrasonic flowmeter is manufactured by using the ultrasonic flowmeter production method according to the present invention, an effect of preventing adhesion of the microscopic bubbles on the inner peripheral surface 1a of the measurement pipe 1 is greatly beneficial.

The first transmitting body 2a and the second transmitting body 2b of the pair of transmitting bodies 2 are provided on outer side portions of the measurement pipe 1 so as to be spaced apart from each other in an axis direction of the measurement pipe 1, and are fused at fused portions 4 so as to be integral with the measurement pipe 1. Preferably, as in the embodiment shown in FIG. 1, each of the first transmitting body 2a and the second transmitting body 2b has a substantially conical shape, a diameter of which is increased towards a bottom face side from a cone point side, and inner peripheral surfaces of through holes of the first transmitting body 2a and the second transmitting body 2b, which surround a circumference of the measurement pipe 1, are fused at the fused portions 4 so as to be entirely integral with the outer peripheral surface of the measurement pipe 1. Further, the first transmitting body 2a and the second transmitting body 2b are disposed opposite to each other so that the cone point sides thereof are positioned closer to each other and the bottom face sides are farther from each other. On the bottom face sides, the first transmitting body 2a and the second transmitting body 2b have end faces extending in a direction perpendicular to the axis direction of the measurement pipe 1.

Figure 1:
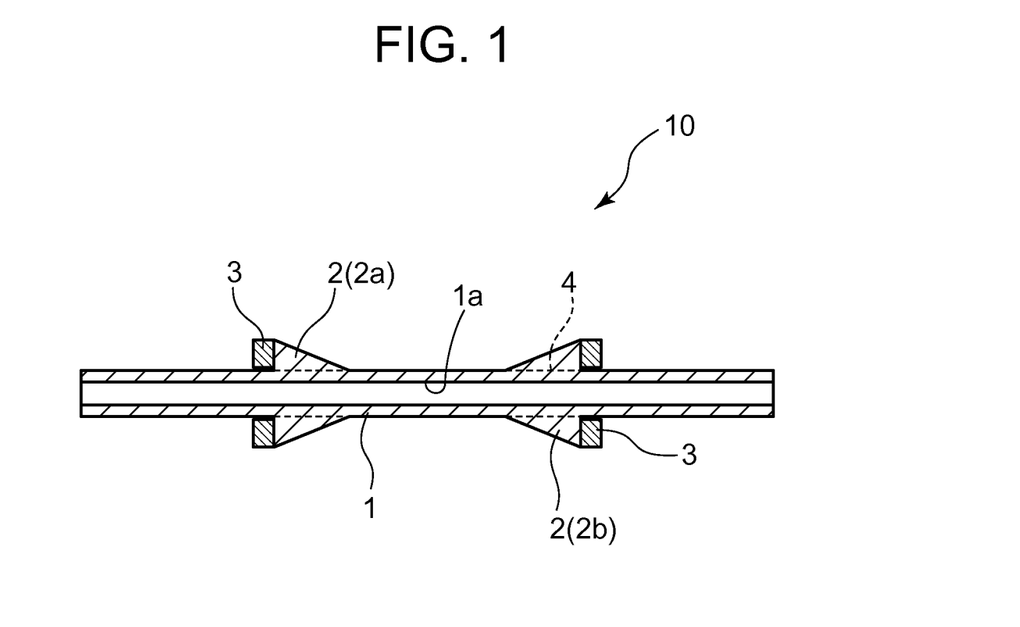
FIG. 1 is a longitudinal sectional view showing an overall configuration of a first embodiment of an ultrasonic flowmeter produced by a method of producing an ultrasonic flowmeter according to the present invention.
Figure 2:
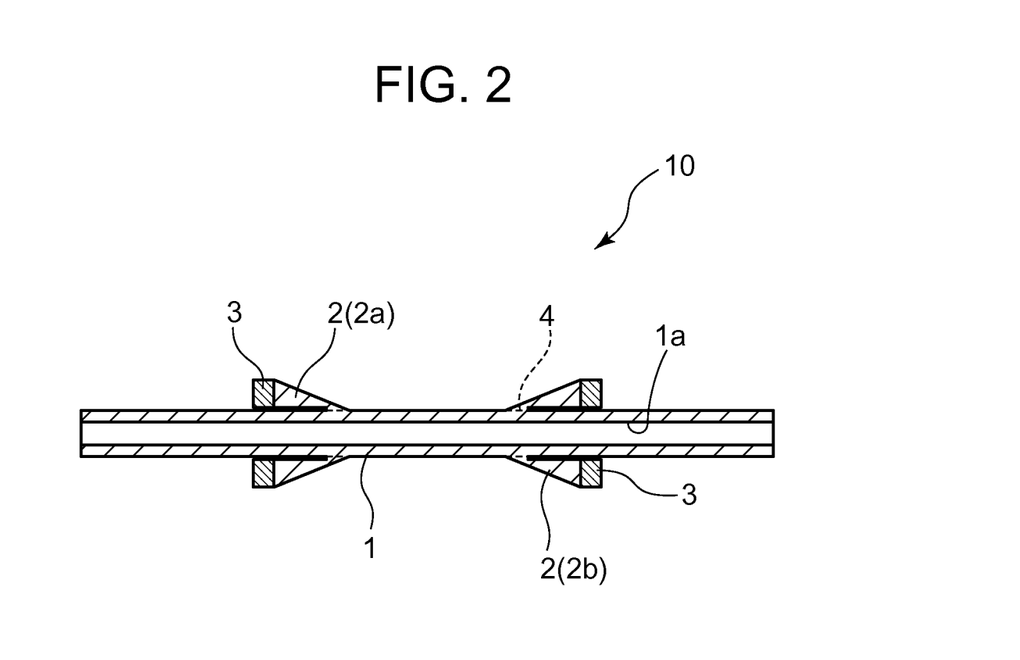
FIG. 2 is a longitudinal sectional view showing a first variation of the ultrasonic flowmeter shown in FIG. 1.
Figure 3:
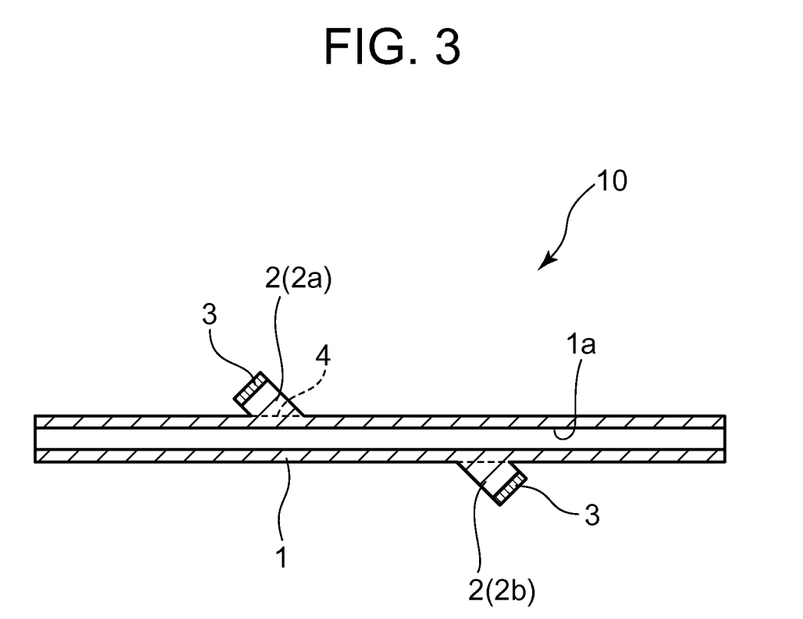
FIG. 3 is a longitudinal sectional view showing a second variation of the ultrasonic flowmeter shown in FIG. 1.

However, a shape of the transmitting body 2 is not limited to the shape described in the embodiment shown in FIG. 1. For example, in the embodiment shown in FIG. 1, each of the transmitting bodies 2 (the first transmitting body 2a and the second transmitting body 2b) has a substantially conical shape, and the inner peripheral surfaces of the through holes, which surround a circumference of the measurement pipe 1, are fused at the fused portions 4 so as to be entirely integral with the outer peripheral surface of the measurement pipe 1. However, as shown in FIG. 2, it is also possible that the diameter of the through hole on the bottom face side is increased so as to be larger than the diameter of the through hole on the cone point side and that the fused portion 4 is formed only at a part of the inner peripheral surface of the through hole on the cone point side while the remaining part of the inner peripheral surface of the through hole is separated from the outer peripheral surface of the measurement pipe 1. In this case, it is preferred that at least one third of the inner peripheral surface of the through hole of each of the transmitting bodies 2 is integrally fused so that an ultrasonic wave is easily propagated in the measurement pipe 1 from each of the transmitting bodies 2. Further, each of the transmitting bodies 2 may have a non-conical shape such as a semispherical shape in which a planar portion is arranged so as to be perpendicular to the axis direction of the measurement pipe 1, or a shape of a column extending obliquely to the axis direction of the measurement pipe 1 as shown in FIG. 3. Also, each of the transmitting bodies 2 does not have to surround an entire circumference of the measurement pipe 1, and may be provided only in a part of the entire circumference of the measurement pipe 1 as shown in FIG. 3.

A material for the transmitting bodies 2 is not particularly limited as long as it is possible to form the transmitting bodies 2 by insert molding. For example, transmitting bodies 2 may be made of a synthetic resin such as perfluoroalkoxy fluorocarbon resin (PFA), polyvinylidene fluoride (PVDF), polyvinyl chloride (PVC) or polypropylene (PP), or may be made of metal such as duralumin, aluminum, aluminum alloy, titanium or stainless steel (SUS). However, the transmitting bodies 2 are preferably made of the same material as the measurement pipe 1 in order to realize good propagation capability of an ultrasonic vibration.

The ultrasonic transducers 3 used as ultrasonic transceivers are not particularly limited as long as the ultrasonic transducers 3 can generate ultrasonic waves. For example, the ultrasonic transducer 3 may be an ultrasonic transducer which is fabricated by using a piezoelectric material such as lead zirconate titanate (PZT) and generates an ultrasonic wave by extending and contracting in an axis direction when voltage is applied. The ultrasonic transducers 3 are mounted on the transmitting bodies 2, respectively, so that an ultrasonic wave generated by one of the ultrasonic transducers 3 is propagated to the other ultrasonic transducer 3 through a fluid in the measurement pipe 1. In the embodiment shown in FIG. 1, each of the ultrasonic transducers 3 has a doughnut shape or a shape of a disk with a hole, and the axial end faces of the ultrasonic transducers 3 are bonded to the end faces of the transmitting bodies 2 on the bottom face side, respectively, by an adhesive or the like. The inner diameter of the ultrasonic transducer 3 is substantially equal to the diameter of the through hole of each of the transmitting bodies 2 on the bottom face side, and an inner peripheral surface of the ultrasonic transducer 3 are separated from the outer peripheral surface of the measurement pipe 1. However, the shape of the ultrasonic transducer 3 is not limited to the shape of the disk with the hole, and may be, for example, a semicircular shape or a sector shape.

Figure 4A:
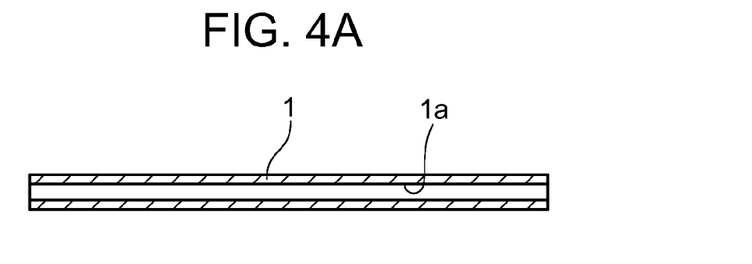
FIGS. 4A to 4D are explanatory views showing steps of the ultrasonic flowmeter production method according to the present invention.

Next, the procedure for producing the ultrasonic flowmeter 10 shown in FIG. 1 according to the ultrasonic flowmeter production method of the present invention will be described with reference to FIGS. 4A to 4D. First, as shown in FIG. 4A, the measurement pipe 1 is fabricated in advance so that the inner peripheral surface thereof has an arithmetic mean roughness Ra (0 μm<Ra<0.4 μm) smaller than that of the measurement pipe fabricated by cutting work. The arithmetic mean roughness Ra of the inner peripheral surface of the measurement pipe 1 is preferably within the range of 0 μm<Ra≤0.2 μm, and more preferably, the range of 0 μm<Ra≤0.02 μm, so that it is less likely that the microscopic bubbles are adhered to the inner peripheral surface of the measurement pipe. It is particularly preferable that the measurement pipe 1 is fabricated by extrusion molding because the measurement pipe 1 having the inner peripheral surface 1a of the arithmetic mean roughness of 0 μm<Ra≤0.2 μm can be easily fabricated.

Figure 4B:
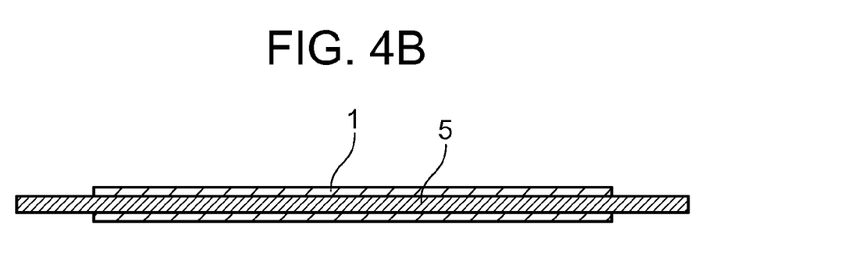
Figure 4C:
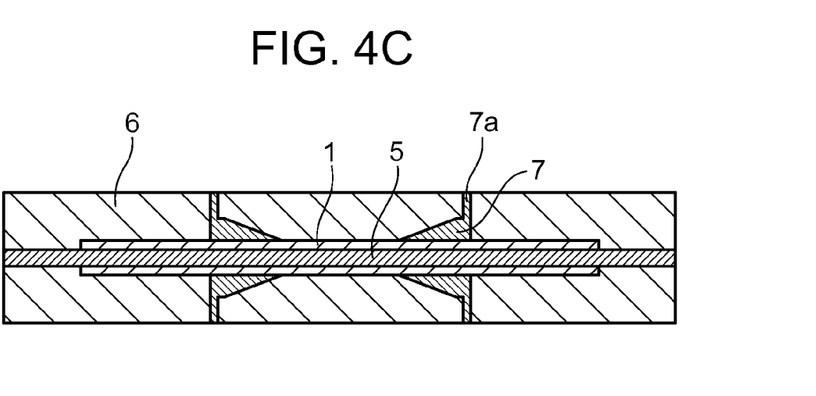
Figure 4D:
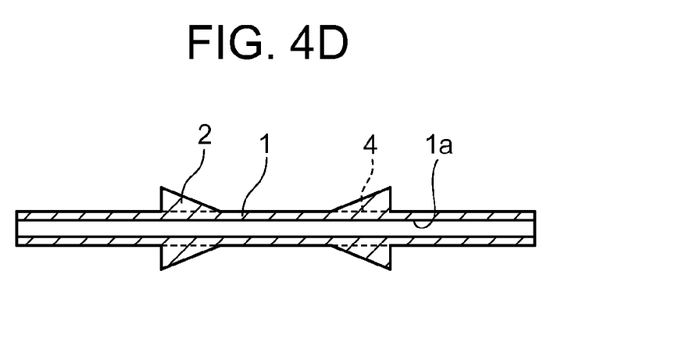

Next, after a straight pin is inserted into the measurement pipe 1 fabricated in advance as shown in FIG. 4B, the measurement pipe 1 with the straight pin 5 inserted therein is set in the mold 6 as an insert, as shown in FIG. 4C, and then a material for forming the transmitting bodies 2 is injected into the mold 6, thus carrying out insert molding. Insert molding may be carried out by compression molding of the material for the transmitting bodies 2, instead of injection molding. When the molding material is cooled so that the molded portions 7 are solidified integrally with the measurement pipe 1, the measurement pipe 1 and the molded portions 7 formed to be integral with each other are taken out of the mold 6, and runner portions 7a are removed from the molded portions 7 by cutting, thereby forming the transmitting bodies 2.

After the pair of transmitting bodies 2 is thus formed by insert molding at predetermined positions on the outer side portions of the measurement pipe so as to be integrally with the measurement pipe 1 in a state where the pair of transmitting bodies 2 are spaced apart from each other by a predetermined distance in the axis direction of the measurement pipe 1, the ultrasonic transducers 3 are mounted on the end faces of the transmitting bodies 2, respectively, by an adhesive or the like, thereby fabricating the ultrasonic flowmeter 10 shown in FIG. 1.

In a case where the measurement pipe 1 and the pair of transmitting bodies 2 are integrated with each other by using an adhesive, an amount of the adhesive applied, drying time of the adhesive, uniformity of application of the adhesive, and so on affect performance of the ultrasonic flowmeter 10, and proficiency of an operator affects yield. Therefore, in order to avoid variation of the performance of the ultrasonic flowmeter, the amount of the adhesive applied, drying time of the adhesive, and so on have to be controlled, thereby causing a cost increase. Moreover, there has been a problem that assembly is more difficult when the size of the ultrasonic flowmeter is smaller and the diameter of the measurement pipe 1 is smaller. In contrast, according to the ultrasonic flowmeter production method of the present invention, it is not necessary to use an adhesive to integrate the measurement pipe 1 and the pair of transmitting bodies 2 with each other, and therefore the problem stated above is avoidable. Further, when a fluorine resin such as PFA and PVDF is used as the material for the measurement pipe 1, adhesion by use of an adhesive is not suitable for fixing the pair of transmitting bodies 2 to the measurement pipe 1 and use of the method of producing the ultrasonic flowmeter according to the present invention is more suitable.

According to the ultrasonic flowmeter production method of the present invention, the measurement pipe 1 is fabricated in advance in a different process and therefore the surface roughness of the inner peripheral surface of the measurement pipe 1 can be easily reduced, thereby easily producing the ultrasonic flowmeter in which the microscopic bubbles are less likely to be adhered to the inner peripheral surface of the measurement pipe 1. The ultrasonic flowmeter production method according to the present invention is especially effective in the case where the measurement pipe 1 is fabricated from a fluorine resin such as PFA and PVDF, because a surface tension of a fluorine resin such as is large and the bubbles are thus easily adhered to the inner surface of the measurement pipe 1. Further, according to the ultrasonic flowmeter production method of the present invention, the pair of transmitting bodies 2 can be formed at predetermined positions on the outer side portions of the measurement pipe 1 without depending on proficiency of an operator and with almost no variation, because the measurement pipe 1 and the pair of transmitting bodies 2 are formed to be integrally with each other by insert molding. Therefore, the ultrasonic flowmeter 10 with high measurement accuracy can be provided easily.

In particular, when the measurement pipe 1 is fabricated by extrusion molding, the measurement pipe 1 having the inner peripheral surface of the arithmetic mean roughness Ra of 0.02 μm or less can be fabricated easily. In addition, in the case where the measurement pipe 1 is fabricated by extrusion molding, no draft is needed in the inner peripheral surface of the measurement pipe 1 unlike the case where the measurement pipe 1 is fabricated by injection molding. When a draft is provided in the inner peripheral surface of the measurement pipe 1, the flow velocity of the fluid in the measurement pipe 1 changes depending on a location, which influences measurement, and the influence is even larger especially in the measurement pipe 1 having a small diameter. In the case of the measurement pipe 1 having the inner diameter of 5 mm or less and the length of 30 mm or more, it is especially difficult to fabricate the measurement pipe 1 by injection molding. However, by fabricating the measurement pipe 1 by extrusion molding, such a problem is prevented and the measurement pipe 1 having the small diameter can be fabricated easily. This makes it possible to produce the ultrasonic flowmeter with high measurement accuracy, which hardly causes adhesion of the microscopic bubbles to the inner peripheral surface of the measurement pipe 1 and makes it possible to measure a micro flow rate. Further, in the case where the measurement pipe 1 is fabricated by extrusion molding, the measurement pipe 1 has excellent thermal stability and productivity when insert molding is carried out by using the measurement pipe, because the measurement pipe 1 is heated once when the measurement pipe 1 is fabricated.

Although the measurement pipe 1 and the pair of transmitting bodies 2 can be formed to be integral with each other by injection molding, it is difficult to design a mold and control forming conditions especially in the case of the measurement pipe 1 having a small diameter (the measurement pipe 1 having the inner diameter of 2 mm or less) because it is necessary to reduce the surface roughness of the inner peripheral surface of the measurement pipe 1 in order to restrain adhesion of microscopic bubbles. However, when the measurement pipe 1 is fabricated by extrusion molding, the measurement pipe 1 having the small surface roughness can be easily fabricated and the problem stated above does not occur.

Next, the operation of the ultrasonic flowmeter 10 produced as stated above will be described.

In the ultrasonic flowmeter 10, when a voltage pulse or a voltage having no frequency component is applied from a converter (not shown) to the ultrasonic transducer 3 located on the upstream side along the fluid flow direction, the ultrasonic transducer 3 generates a vibration in a direction along the thickness (i.e., in a direction of voltage application) and in a diameter direction (i.e., in a direction perpendicular to the direction of the voltage application) of the ultrasonic transducer 3. The end faces on the bottom face side, i.e., the axial end face, of the transmitting body 2 is fixedly secured to the axial end face of the ultrasonic transducers 3 and a voltage is applied between both axial end faces of the ultrasonic transducers 3, so that the ultrasonic vibration in the direction along the thickness, which has a large energy of the ultrasonic vibration, is propagated to the end face of the transmitting body 2 on the bottom face side. The ultrasonic vibration thus propagated to the transmitting body 2 is further transmitted to the fluid in the measurement pipe 1 through the transmitting body 2 and the pipe wall of the measurement pipe 1 and is propagated in the fluid inside the measurement pipe 1 while being repeatedly reflected on the outer peripheral surface of the measurement pipe 1. Thereafter, the ultrasonic vibration is propagated, through the transmitting body 2 located on the downstream side in opposed relation, to the ultrasonic transducer 3 fixed to the transmitting body 2 located on the downstream side, and is converted into an electric signal, which is outputted to the converter.

When the ultrasonic vibration is transmitted from the upstream ultrasonic transducer 3 to the downstream ultrasonic transducer 3 and received by it, the transmitting and receiving sides are instantaneously switched in the converter, and a voltage pulse or a voltage having no frequency component is applied from the converted to the downstream ultrasonic transducer 3. Then, similarly to the upstream ultrasonic transducer 3, the ultrasonic vibration is generated and propagated to the fluid in the measurement pipe 1 through the transmitting body 2. This ultrasonic vibration is again received by the ultrasonic transducer 3 fixed to the transmitting body located on the upstream side in opposed relation and is then converted into an electric signal, which is outputted to the converter. In the process, the ultrasonic vibration is propagated against the flow of the fluid in the measurement pipe 1. Therefore, the propagation velocity of the ultrasonic vibration in the fluid is lower than when the ultrasonic vibration transmitted from the upstream ultrasonic transducer 3 is received by the downstream ultrasonic transducer 3, and the propagation time is longer.

In the converter, the propagation time of the ultrasonic vibration from the upstream ultrasonic transducer 3 to the downstream ultrasonic transducer 3 and the propagation time of the ultrasonic vibration from the downstream ultrasonic transducer 3 to the upstream ultrasonic transducer 3 are measured, and a flow velocity and a flow rate are computed based on a difference between the propagation times. Thus, highly accurate measurement of a flow rate can be achieved.

Figure 5A:
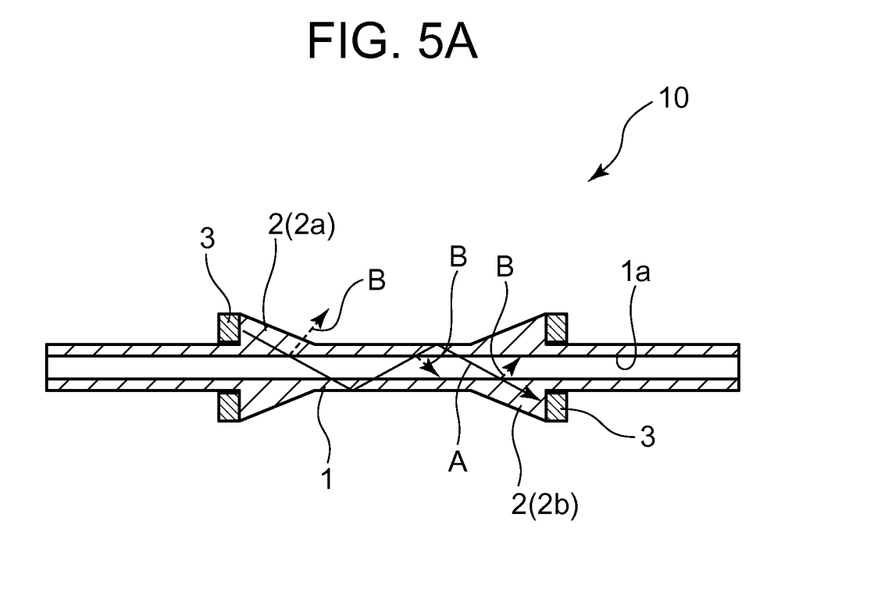
FIGS. 5A and 5B are explanatory views for explaining influences of microscopic bubbles adhered on an inner peripheral surface of a measurement pipe of the ultrasonic flowmeter.
Figure 5B:
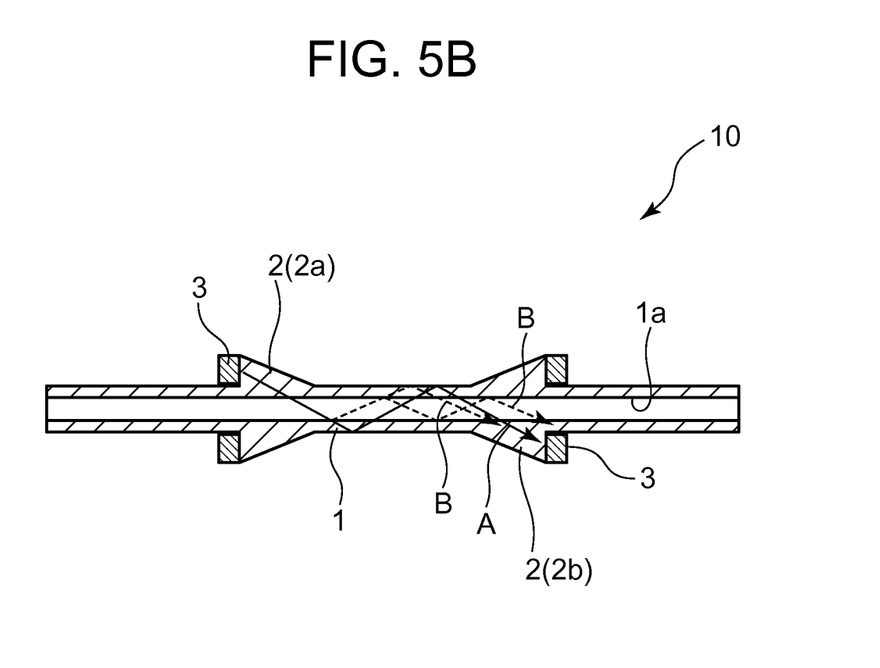

Microscopic bubbles adhered to the inner peripheral surface 1a of the measurement pipe 1 of the ultrasonic flowmeter 10 reflect ultrasonic waves on the surfaces of the microscopic bubbles. As shown by an arrow A in FIG. 5A, the ultrasonic vibration that is not affected by the microscopic bubbles is propagated in the measurement pipe 1 while being repeatedly reflected on the outer peripheral surface of the measurement pipe 1. However, as shown by arrows B in FIG. 5A, when microscopic bubbles are adhered to the inner peripheral surface 1a of the measurement pipe 1, the ultrasonic vibration, which has been propagated from the ultrasonic transducer 3 on the transmitting side to the transmitting body 2 and the measurement pipe 1, is reflected on a boundary between the measurement pipe 1 and the microscopic bubbles, i.e., near the inner peripheral surface 1a of the measurement pipe 1, thereby disturbing propagation of the ultrasonic vibration to the fluid in the measurement pipe 1, or the ultrasonic vibration, which is propagated in the fluid in the measurement pipe 1, is reflected on a boundary between the fluid in the measurement pipe 1 and the microscopic bubbles, thereby disturbing entrance of the ultrasonic vibration into the ultrasonic transducer 3 on the receiving side. As a result, an amount of ultrasonic waves that reach the ultrasonic transducer 3 on the receiving side can be reduced, thereby causing a reduction of signal strength. As shown in FIG. 5B, the ultrasonic vibration that is not affected by the microscopic bubbles is propagated in the measurement pipe 1 while being repeatedly reflected on the outer peripheral surface of the measurement pipe 1 as indicated by an arrow A. On the other hand, as indicated by an arrow B, when the microscopic bubbles are adhered to the inner peripheral surface 1a of the measurement pipe 1, the ultrasonic vibration is reflected on a boundary surface between the microscopic bubbles and the surrounding area thereof, thereby making differences among propagation passages of the ultrasonic vibration and affecting the propagation time. As a result, measurement accuracy can be deteriorated.

By producing the ultrasonic flowmeter 10 according to the ultrasonic flowmeter production method of the present invention, the surface roughness of the inner peripheral surface 1a of the measurement pipe 1 of the ultrasonic flowmeter 10 can be easily reduced, thereby becoming smoothed. Therefore, it is possible to restrain adhesion of microscopic bubbles on the inner peripheral surface 1a of the measurement pipe 1, thus avoiding a reduction of signal strength and deterioration of measurement accuracy due to the microscopic bubbles.

Figure 6:
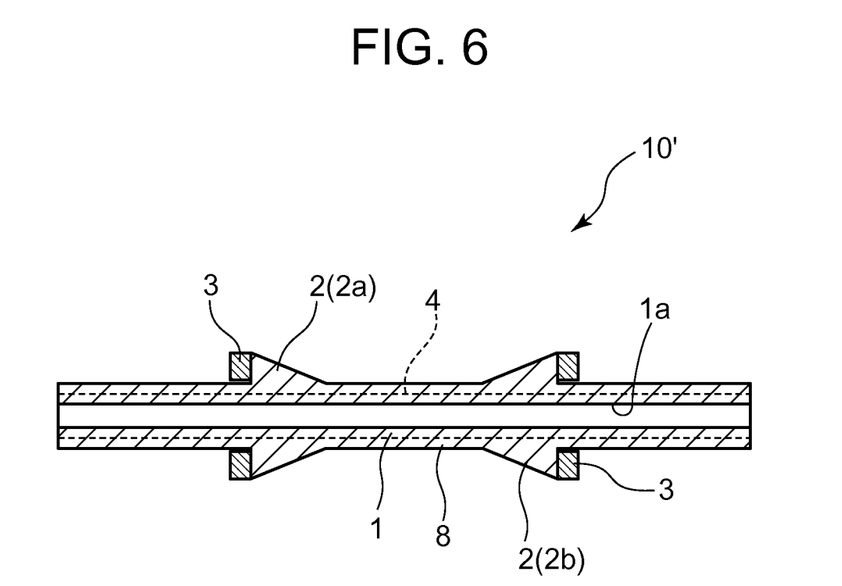
FIG. 6 is a longitudinal sectional view showing a second embodiment of an ultrasonic flowmeter according to the present invention.
Figure 7:
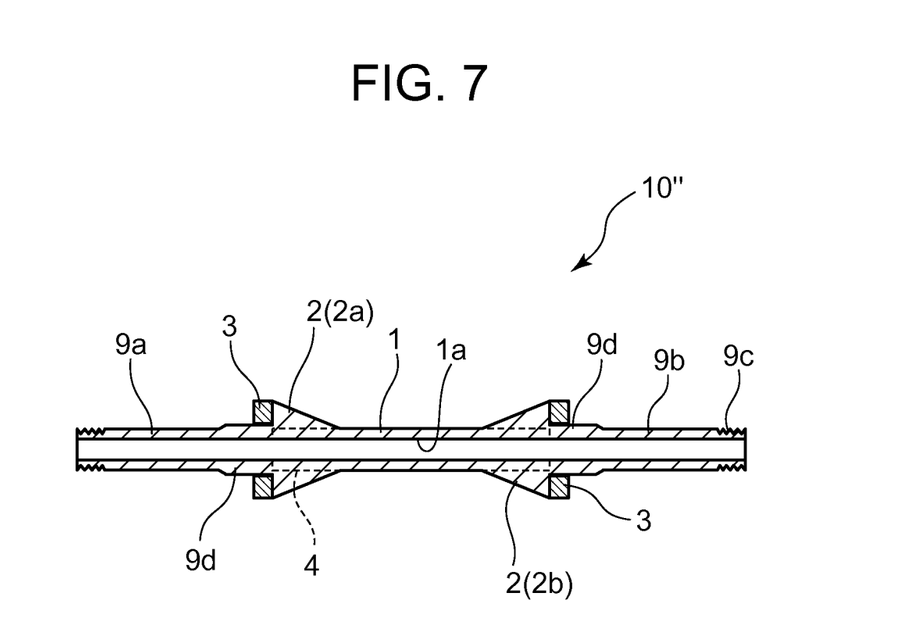
FIG. 7 is a longitudinal sectional view showing a third embodiment of an ultrasonic flowmeter according to the present invention.

The ultrasonic flowmeter and the ultrasonic flowmeter production method according to the present invention have been described, using the ultrasonic flowmeter 10 of the first embodiment shown in FIG. 1 as an example. However, application of the present invention is not limited to the configuration of the ultrasonic flowmeter 10 of the first embodiment. In the ultrasonic flowmeter 10 of the first embodiment shown in FIG. 1, the outer peripheral surface of the measurement pipe 1 and the inner peripheral surfaces of the through holes of the transmitting bodies 2 are fused integrally with each other at the fused portions 4. However, the transmitting bodies 2 may be provided, by any other way, on the outer side portions of the measurement pipe 1 so as to be integral with the measurement pipe 1. For example, like an ultrasonic flowmeter 10' of a second embodiment shown in FIG. 6, an outer measurement pipe portion 8 having a pair of transmitting bodies 2 may be formed by insert molding on outer side portions of the measurement pipe 1, and an outer peripheral surface of the measurement pipe 1 and an inner peripheral surface of the outer measurement pipe portion 8 may be fused to be integral with each other at the fused portion 4. In the ultrasonic flowmeter 10 of the first embodiment, the measurement pipe 1 and the pair of transmitting bodies 2 are formed to be integral with each other by insert molding. However, like an ultrasonic flowmeter 10" of a third embodiment shown in FIG. 7, an inlet flow passage 9a and an outlet flow passage 9b may be formed to be integral with the measurement pipe 1 on the upstream side and the downstream side of the measurement pipe 1, respectively. Further, a joint portion 9c and/or a holding portion 9d for holding the ultrasonic flowmeter 10" on a housing (not shown) may be provided on the inlet flow passage 9a and the outlet flow passage 9b formed by insert molding.

Figure 8:
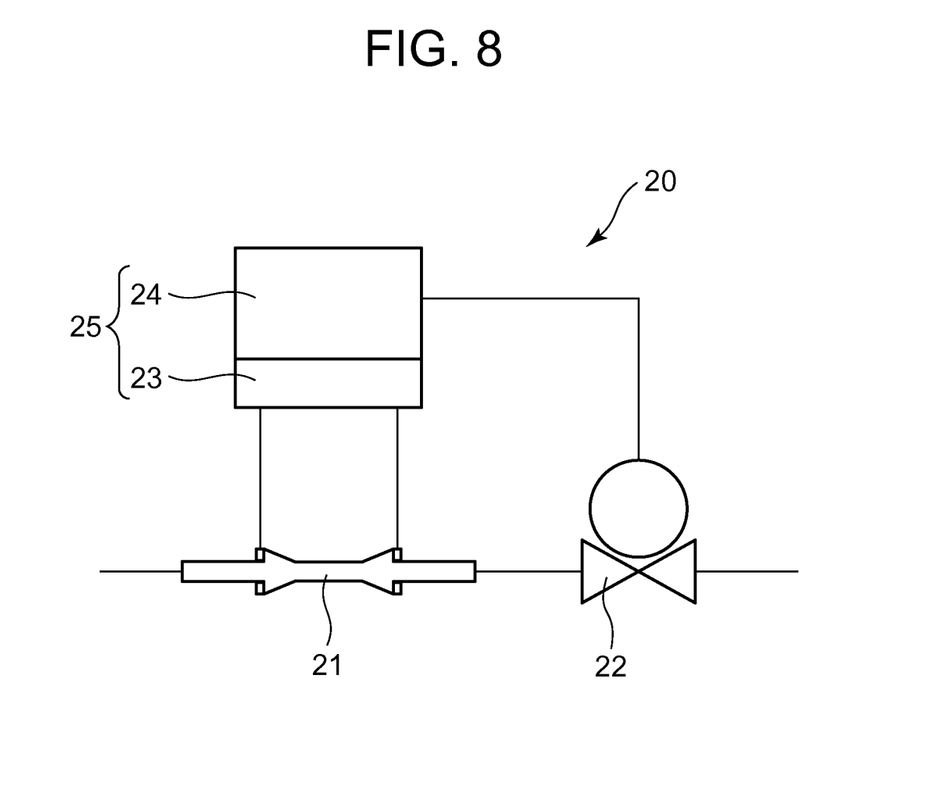
FIG. 8 is an overall configuration diagram of a fluid controller using the ultrasonic flowmeter produced by the ultrasonic flowmeter production method according to the present invention.

FIG. 8 shows a fluid controller 20 having used the ultrasonic flowmeter according to the present invention.

The fluid controller 20 includes an ultrasonic flowmeter 21, and a fluidic element 22 for adjusting a flow rate, a flow velocity, a pressure and so on of a fluid, and an electric component 25 that processes an output signal from the ultrasonic flowmeter 21 and performs control. As the ultrasonic flowmeter 21, an ultrasonic flowmeter produced by the method of producing the ultrasonic flowmeter according to the present invention is used, such as the ultrasonic flowmeter 10 of the first embodiment shown in FIG. 1, the variations of the ultrasonic flowmeter 10 shown in FIGS. 2 and 3, the ultrasonic flowmeter 10' of the second embodiment shown in FIG. 6, or the ultrasonic flowmeter 10" of the third embodiment shown in FIG. 7.

For example, an electric-driven or air-driven pinch valve may be used as the fluidic element 22. However, the fluidic element 22 is not limited to the electric-driven or air-driven pinch valve as long as the fluidic element 22 is an instrument for adjusting a flow rate, a flow velocity, a pressure and so on of a fluid.

The electric component 25 includes an amplifier part 23 that amplifies an output signal from the ultrasonic transducer 3 of the ultrasonic flowmeter 21 (i.e., ultrasonic flowmeter 10, 10' or 10"), and a control part 24 that performs control based on the signal amplified by the amplifier part 23, so that the electric component 25 can control the operation of the fluidic element 22 based on a control signal from the control part 24 and perform fluid control.

Since the ultrasonic flowmeter 21 according to the present invention is used in the fluid controller 20, it is possible to measure a flow rate of a fluid with high accuracy, thereby achieving accurate fluid control.

Figure 9:
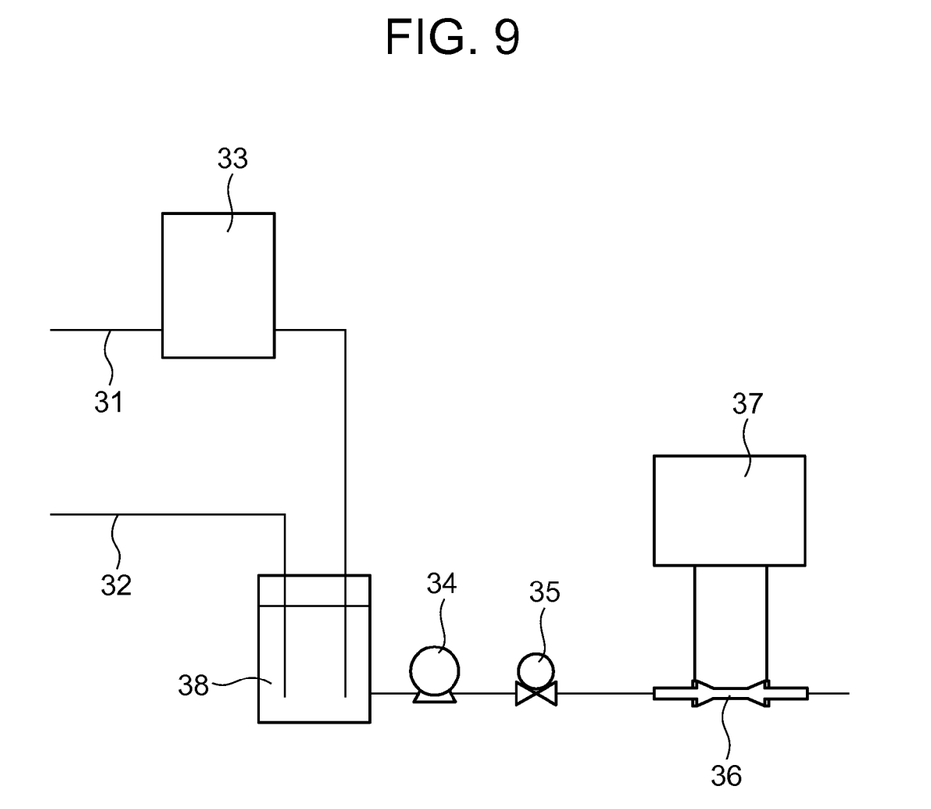
FIG. 9 is a schematic view showing an overall configuration of experimental equipment for studying an influence of the surface roughness of the inner peripheral surface of the measurement pipe of the ultrasonic flowmeter on measurement accuracy and output signal strength.

FIG. 9 shows experimental equipment for confirming an influence of adhesion microscopic bubbles due to surface roughness on measurement accuracy and signal strength. In the experiment, air 32 was supplied into a tank 38 filled with pure water 31 degassed by a degasifier 33, and bubbling was performed for 30 minutes. Thus, pure water containing microscopic bubbles was prepared. While adjusting a flow rate by using a valve 35, the pure water containing the microscopic bubbles was supplied by a pump 34 from the tank 38 to an ultrasonic flowmeter 36, and output signals from the ultrasonic flowmeter 36 (specifically, the ultrasonic transducer on the receiving side thereof) was observed by using an oscilloscope 37. In the experiment, a size of the measurement pipe of the ultrasonic flowmeter 36 was unified to a length of 40 mm, an outer diameter of 3 mm, and an inner diameter of 2 mm, and a square-wave voltage pulse having a frequency of 600 kHz and an amplitude of ±5 V was applied to an ultrasonic transducer on a transmitting side.

Under the conditions stated above, a peak-to-peak voltage Vp-p of an output signal from an ultrasonic transducer on a receiving side when a conventional ultrasonic flowmeter having a measurement pipe and transmitting bodies fabricated integrally with each other by cutting work was used as the ultrasonic flowmeter 36 was compared with a peak-to-peak voltage Vp-p of an output signal from the ultrasonic transducer on the receiving side when the ultrasonic flowmeter 10, 10', or 10" according to the present invention was used as the ultrasonic flowmeter 36. The inner peripheral surface of the measurement pipe fabricated integrally with the transmitting bodies by cutting work had an arithmetic mean roughness Ra of 0.4 μm, and, when an ultrasonic flowmeter using the measurement pipe fabricated by cutting work was used as the ultrasonic flowmeter 36, an output signal from the ultrasonic flowmeter was 40 to 75 mVp-p. On the other hand, the inner periphery 1a of the measurement pipe 1, fabricated by extrusion molding and used in the ultrasonic flowmeter 10, 10', or 10", had the arithmetic mean roughness Ra of 0.2 μm, and an output signal from the ultrasonic flowmeter 10, 10', or 10" using the measurement pipe 1 was 100 to 170 mVp-p. This confirmed that the strength of the received signal was enhanced, and an influence of the microscopic bubbles was reduced. In addition, an effect of improvement in measurement accuracy was also achieved.

The invention claimed is:

1. A method of producing an ultrasonic flowmeter, said ultrasonic flowmeter comprising
a measurement pipe configured for a fluid to flow through, said measurement pipe having outer side portions spaced apart from each other in an axis direction of the measurement pipe; and
two ultrasonic transceivers provided on the outer side portions of the measurement pipe,
said method comprising:
forming said measurement pipe of fluorine resin by extrusion molding in advance;
inserting a single straight pin into the measurement pipe, wherein the straight pin extends through a full length of the measurement pipe;
setting an entirety of said measurement pipe with said straight pin inserted therein inside a mold for injection molding as an insert;
forming two transmitting bodies, by injecting the same material as said measurement pipe, at predetermined positions, on the outer side portions of said measurement pipe so as to be spaced apart from each other by a predetermined distance in the axis direction of said measurement pipe, so that said two transmitting bodies are integral with said measurement pipe when the injected material is solidified, said two transmitting bodies surrounding a circumference of said measurement pipe; and
mounting said two ultrasonic transceivers on said two transmitting bodies, respectively.

2. The method to claim 1, wherein an arithmetic mean roughness Ra of an inner peripheral surface of said measurement pipe satisfies a relation of $0\ \mu m < Ra \leq 0.2\ \mu m$.

3. The method according to claim 2, wherein an inner diameter D of said measurement pipe satisfies a relation of $0.5\ mm \leq D \leq 10\ mm$.

4. The method according to claim 1, wherein a flow passage or a joint is formed by insert molding on at least one of an upstream side and a downstream side of said measurement pipe in the axis direction of the measurement pipe so as to be integral with said measurement pipe.

5. The method according to claim 1, wherein
a flow passage is formed by insert molding on at least one of an upstream side and a downstream side of said measurement pipe in the axis direction of the measurement pipe so as to be integral with said measurement pipe, and
a joint is formed by insert molding on the flow passage on at least one of the upstream side and the downstream side of said measurement pipe.

6. The method according to claim 1, wherein said forming the transmitting bodies further includes
removing, from the mold, the measurement pipe and molded portions formed by the same material as said measurement pipe.

7. The method according to claim 1, wherein, in said inserting the single straight pin into the measurement pipe, the single straight pin continuously extends beyond two opposing ends of the measurement pipe.

* * * * *